Figure 1:
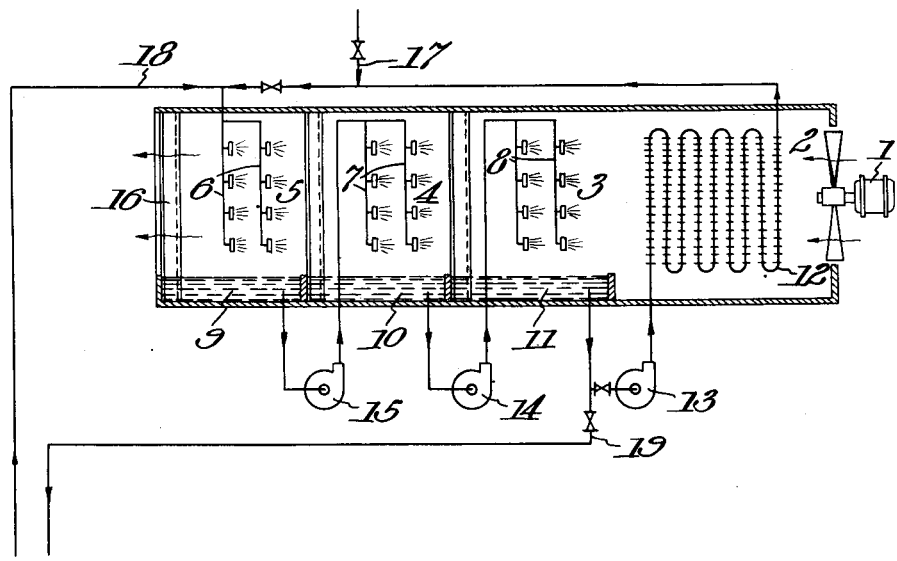

June 12, 1934. A. S. RICHARDSON 1,962,572
METHOD AND APPARATUS FOR COOLING WATER AND AIR
Filed Oct. 25, 1932

Inventor:
Allan S. Richardson
By Byrnes, Townsend + Potter
Attorneys.

Patented June 12, 1934

1,962,572

UNITED STATES PATENT OFFICE 1,962,572

METHOD AND APPARATUS FOR COOLING WATER AND AIR

Allan S. Richardson, Butte, Mont.

Application October 25, 1932, Serial No. 639,495

8 Claims. (Cl. 62—176)

This invention relates to a method and apparatus for cooling water and air, and particularly to a method and apparatus for utilizing the evaporative cooling effect of atmospheric air of low relative humidity. The invention is especially adapted to the cooling of air and water or both in connection with the ventilation and cooling of mines but is not limited to such use.

A principal purpose of the invention is to utilize effectively the high evaporative cooling effect of atmospheric air of low relative humidity.

The lower limit of cooling in ordinary cooling tower practice is the wet bulb temperature of the air. However, when atmospheric air of low relative humidity is available, as in the arid western States, for example, a much greater cooling effect is obtainable by means of applicant's invention which makes it possible to cool to a temperature approximating the dew point of the atmospheric air. Since in arid regions the dew point is frequently more than 20° F. lower than the wet bulb temperature of the atmosphere a very decided advantage may be gained by applicant's invention, particularly since it is in just such regions that the problem of cooling and ventilating mine works is a matter of importance.

In brief, the invention comprises cooling atmospheric air of low relative humidity, by indirect heat exchange with water, to a temperature approaching the dew point, utilizing at least a portion of the air thus cooled to cool water by direct contact, for example by spraying or the like, and utilizing at least a portion of the water thus cooled for cooling the air by indirect heat exchange. Instead of water, brine or other aqueous cooling medium may be used. By this method of operation the air, cooled to its dew point without humidification by the indirect heat exchange, is capable of absorbing in direct contact with water a much larger quantity of heat than was required to cool it to its dew point without humidification.

The following atmospheric conditions actually prevailing in the summer in a mining State of the West may be taken as an example:

Barometer _____ 24.4 inches of Hg.
Temperature _____ 90° F.
Wet bulb temperature _____ 60° F.
Relative humidity _____ 17%
Dew point _____ 39° F.

Assuming that 10,000 cubic feet of air were cooled down to 39° by indirect heat exchange with water, the water would have to absorb approximately 7,250 B. t. u. After having been thus cooled the same air then has the ability to absorb 25,750 B. t. u. by direct contact evaporative heat exchange with water assuming it to become saturated with water vapor at 90° F. The excess cooling effect of the air in evaporative cooling is therefore 18,500 B. t. u. and is the net cooling effect available for cooling water or air, and the final temperature limit to which the water or air can be cooled under the conditions given above is, of course, 39° F.

Figure 2:
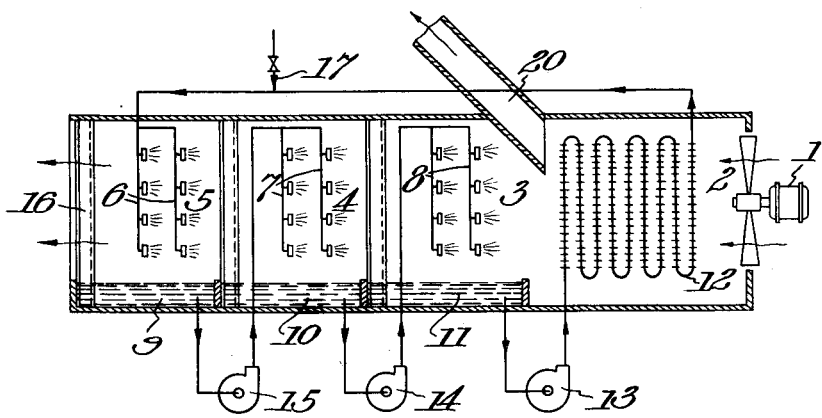

The invention will be more particularly described for purposes of illustration with reference to the accompanying drawing, in which, Fig. 1 represents an embodiment of the invention adapted for the supplying of cooled water; and Fig. 2 represents an embodiment of the invention adapted for the supplying of cooled air.

In the figures, a stream of atmospheric air is blown by fan 1, successively through an indirect heat exchanger 2 and through a series of spray chambers 3, 4 and 5, provided with spray devices, 6, 7 and 8 and sumps 9, 10 and 11. Water at the lowest temperature is pumped from sump 11 through radiator coil 12 to spray device 6, while water from sumps 10 and 9 is pumped to spray devices 8 and 7, respectively, by means of pumps 14 and 15, respectively. The stream of air saturated with water vapor at the temperature of the atmosphere leaves the apparatus at 16. Make-up water to compensate for the amount of water taken up by the air is added to the system at 17.

In Fig. 1, which shows an embodiment particularly adapted for recooling brine or water for use in cooling mine workings, the brine or water coming from the mine at 18 first passes through the series of sprays and is cooled to approximately the dew point of the atmosphere by the air current flowing counter-currently through the spray chambers. After leaving the final spray chamber 3 a part of the water is returned to the mine at 19 and the remainder is forced by pump 13 through water pipe radiator 12 of the extended surface type. This lowers the sensible and wet bulb temperature of the entering atmospheric air, which in turn, operating with a regenerative effect, lowers the temperature of the water in the spray chambers. That portion of the water passed through the radiator, having been heated to approximately the sensible temperature of the atmosphere, is returned to the main water supply and is again circulated through the spray chambers.

Fig. 2 shows an embodiment of the invention which provides for cooling the air to its dew point. In this embodiment the water is recirculated through the spray chambers and the radiator without withdrawing any of the cooled water from the spray system. A quantity of the cooled air, which under the conditions previously set forth in the illustrative example would amount to about two-thirds of the air passed through the indirect heat exchanger, can be withdrawn from the system between the indirect heat exchanger and the spray chambers at 20. It is to be noted that in this method of operation the air is cooled to its dew point without humidification thereby decreasing its total heat. Ordinary air washers, on the contrary, lower the sensible temperature only by increasing the amount of water vapor carried by the air, that is they decrease the sensible heat by increasing the latent heat and do not alter the total heat condition of the air.

What I claim is:

1. A method for utilizing the evaporative cooling effect of atmospheric air of low relative humidity which comprises cooling said air to a point between the wet bulb temperature and the dew point thereof by indirect heat exchange with water at such temperature, cooling water to such temperature by subjecting an extended surface of said water to direct contact with at least a portion of the air previously cooled by said indirect heat exchange, and utilizing at least a portion of the water thus cooled to effect the cooling of said air by said indirect heat exchange.

2. A method for utilizing the evaporative cooling effect of atmospheric air of low relative humidity which comprises cooling said air to approximately the dew point thereof by indirect heat exchange with water at a temperature approximating said dew point, cooling water to approximately said dew point by subjecting an extended surface of said water to direct contact with at least a portion of the air previously cooled by said indirect heat exchange, and utilizing at least a portion of the water thus cooled to effect the cooling of said air by said indirect heat exchange.

3. A method for utilizing the evaporative cooling effect of atmospheric air of low relative humidity which comprises cooling said air to approximately the dew point thereof by indirect heat exchange with water at a temperature approximating said dew point, passing at least a portion of said air into direct contact with water in finely divided form, and utilizing at least a portion of the water thus cooled to effect the cooling of said air by said indirect heat exchange.

4. A method for utilizing the evaporative cooling effect of atmospheric air of low relative humidity which comprises cooling said air to approximately the dew point thereof by indirect heat exchange with water at a temperature approximating said dew point, passing a portion of said air into direct contact with water in finely divided form, and utilizing the water thus cooled to effect the cooling of said air by said indirect heat exchange.

5. A method for utilizing the evaporative cooling effect of atmospheric air of low relative humidity which comprises cooling said air to approximately the dew point thereof by indirect heat exchange with water at a temperature approximating said dew point, passing said air into direct contact with water in finely divided form, and utilizing a portion of the water thus cooled to effect the cooling of said air by said indirect heat exchange.

6. Apparatus for utilizing the evaporative cooling effect of atmospheric air of low relative humidity comprising means for providing a current of air, means for spraying a stream of water into said current of air, collecting means for said water, and means for bringing said collected water into counter-current indirect heat exchange relation with said current of air prior to its direct contact with said stream of water.

7. Apparatus for utilizing the evaporative cooling effect of atmospheric air of low relative humidity comprising means for providing a current of air, means for bringing a stream of water into intimate contact with said current of air, collecting means for said water, and means for bringing said collected water into counter-current indirect heat exchange relation with said current of air prior to its direct contact with said stream of water.

8. Apparatus for utilizing the evaporative cooling effect of atmospheric air of low relative humidity comprising means for providing a current of air, means for spraying a stream of water into said current of air in a plurality of successive counter-current stages, collecting means for said water, and means for bringing said collected water into counter-current indirect heat exchange relation with said current of air prior to its direct contact with said stream of water.

ALLAN S. RICHARDSON.